United States Patent [19]

Prohaska et al.

[11] Patent Number: 4,911,116

[45] Date of Patent: Mar. 27, 1990

[54] COLD-START APPARATUS AND COLD-START METHOD

[75] Inventors: Werner P. Prohaska; Alvarao A. Vasconcelos, both of Sao Paulo, Brazil

[73] Assignee: Robert Bosch GmbH, Stuttgart, Fed. Rep. of Germany

[21] Appl. No.: 332,196

[22] Filed: Apr. 3, 1989

[30] Foreign Application Priority Data

Apr. 7, 1988 [BR] Brazil .............. 8801648[U]

[51] Int. Cl.4 ............................................. F02N 17/00
[52] U.S. Cl. ........................ 123/179 G; 123/180 AC; 123/1 A; 123/576
[58] Field of Search ............... 123/180 AC, 1 A, 576, 123/578, 179 G

[56] References Cited

U.S. PATENT DOCUMENTS

| | | | |
|---|---|---|---|
| 4,380,974 | 4/1983 | Grosso | 123/576 |
| 4,401,094 | 8/1983 | Shimmura et al. | 123/180 AC |
| 4,499,887 | 2/1985 | Billingsley | 123/1 A |
| 4,646,691 | 3/1987 | Kiyota et al. | 123/180 AC |

Primary Examiner—E. Rollins Cross

Attorney, Agent, or Firm—Edwin E. Greigg

[57] ABSTRACT

A cold-start apparatus for alcohol-fueled internal combustion engines in which a certain quantity of gasoline is injected directly into the combustion chambers upon starting. To assure reliable start-up of the engine with the aid of gasoline, and beyond a predetermined temperature, the engine is operated with only alcohol fuel. In order to make gasoline available for the cold start without entailing a major expense, a gasoline storage and supply device is provided. The supply device includes a piston which divides the housing into a work chamber which is filled with alcohol fuel from a work chamber which is filled with gasoline. As the alcohol fuel in the work chamber cools, the piston is forced by a spring inward into the alcohol filled chamber, causing aspiration of gasoline into the gasoline chamber which upon starting of the engine and a build up of pressure in the alcohol work chamber gasoline line is injectable by means of an alcohol fuel pump, via a gasoline delivery line and a gasoline fuel injection valve into the air intake tube until such time as the engine has attained a sufficiently high temperature then only alcohol is used in operating the engine.

16 Claims, 4 Drawing Sheets

COLD-START APPARATUS AND COLD-START METHOD

BACKGROUND OF THE INVENTION

The present invention relates to a cold-start apparatus for alcohol-fueled internal combustion engines having externally supplied ignition. The apparatus has an alcohol fuel cycle embodied by a delivery route beginning at an alcohol fuel tank and leading to the engine distributor tube from whence it leads back to the alcohol fuel tank. A feed device, such as an alcohol fuel pump, is provided in this cycle, and injection valves for injecting alcohol fuel communicate with the distributor tube and with the respective combustion chamber of the engine, and the combustion chambers are supplied with combustion air via an intake tube. The apparatus also has a gasoline cycle including a gasoline tank; a gasoline delivery line beginning at the gasoline cycle is provided to deliver gasoline to or near the combustion chambers, to reinforce the combustion process initially, until combustion can be maintained by the alcohol fuel alone.

The invention also relates to a cold-start method that can be used with this cold-start apparatus.

As is already well known in the art, engines operated with alternative fuels such as alcohol are not capable of starting at low temperatures, in particular at temperatures lower than 10° C. This is because initially, combustion is insufficient for starting the engine, because of the low temperature of the alcohol fuel and of the combustion chambers. The operative physical principle is that the alcohol has high latent heat of evaporation an therefore, as long as it is cold, is incapable of evaporating sufficiently to maintain the aforementioned initial combustion. Even if the combustion at least begins at low temperatures, the problem still exists of maintaining it, because a delayed explosion of the mixture of alcohol fuel and air inside the chamber occurs, leading to frequent failures in engine operation; the engine repeatedly stops operating and the injected quantity of alcohol fuel is increased. If attempts to start the engine are pursued, not only will the engine become flooded, but there is a severe strain on both the electrical and the mechanical parts.

To overcome these problems, which arise in alcohol-fueled internal combustion engines, systems that operate on two principles, below, have been developed.

The first principle is to heat the alcohol fuel, prior to its entry into the combustion chamber, to a temperature at which the alcohol fuel can evaporate and hence can maintain the combustion.

The second principle is to inject a predetermined quantity of gasoline directly into the combustion chambers of the engine. In that case, the combustion is initially reinforced, because the latent heat of vaporization of the gasoline is much lower than that of the alcohol fuel, so that a smaller amount of the evaporated gasoline can suffice for starting the engine, and the engine temperature becomes sufficient for combustion to begin, which in turn enables the engine to warm up to a temperature at which the combustion can be maintained with alcohol alone.

Although the known systems that operate on these principles have represented a functional solution to the problem thus far, they still have many disadvantages. Because of the delayed explosion of the alcohol fuel and air mixture in this transition phase between starting and normal engine operation, frequent engine failure occurs, which is expressed as rpm fluctuations, vibration, bucking, and subsequent and repeated "dying" of the engine; this may necessitate using the starting aid, and may even necessitate repeated attempts at starting.

Conventional systems of this kind have still other disadvantages that must be overcome. Engines that operate by the first principle above require the use of heaters for the fuel delivery lines leading to the combustion chambers. Not only are they impractical, but installing them entails additional difficulty and expense. Moreover, the supply of current to the heaters must be done from the battery of the system before the starter is actuated, s that the battery is discharged; therefore, problems can arise because there is insufficient energy left for actuating the starter and subsequently maintaining reliable ignition.

The conventional cold-start systems that operate on the second of the above principles have major disadvantages as well. Besides those already mentioned, there is the disadvantage that auxiliary mechanical parts, like the starter, and the electrical parts as well are severely strained by the repeated starting that is often required, so that the battery can loose its charge quickly, unless the engine starts immediately. Furthermore, these systems require special lines and injection valves for injecting the alcohol fuel, which makes them especially expensive.

OBJECT AND SUMMARY OF THE INVENTION

In view of the above problems, it is an object of the present invention to provide a cold-start apparatus for alcohol-fueled engines of the above type that overcomes the disadvantages of conventional systems and, because it has a completely novel design, enables automatic non-jerking engine starting and warm-up; the combustion is begun with the aid of gasoline and then operation is maintained after a predetermined temperature has been reached, with alcohol fuel alone.

According to the invention, this object is attained, in a cold-start apparatus for internal combustion engines of the aforementioned type, in that the alcohol fuel cycle communicates mutually interactively with the gasoline cycle by means of a gasoline storage and supply device, which operates as a function of the pressure prevailing in the alcohol fuel cycle. In this proposed apparatus, the number of lines for the gasoline is reduced substantially, and only one gasoline injection valve is required. Engine design can be simplified substantially, because inlets into the combustion chambers for gasoline injection valves are no longer needed.

A preferred embodiment of the apparatus proposed in accordance with the invention is characterized in that the gasoline storage and supply device is capable of storing gasoline in the non-activated state of the alcohol fuel system, and can deliver this gasoline upon starting of the engine, in the activated state of the alcohol fuel system.

A very advantageous feature of the apparatus made in this way is that no gasoline pump is required. Moreover, a stable pressure ratio in the gasoline cycle is established. According to a preferred embodiment of the system, the gasoline storage and supply device communicates with the engine intake tube via a gasoline injection valve, and it includes a housing/piston unit the piston of which is freely movable under spring action in the interior of the housing and divides it into two work chambers, one of which communicates with the alcohol fuel cycle and the other communicates with the gasoline cycle. This assures non-jerking operation from the onset of engine starting.

The invention also proposes a method for cold starting of an alcohol-fueled internal combustion engine that is used with the proposed cold-start apparatus. This method is distinguished in that in a cold-start apparatus for alcohol-fueled engines of the above type, gasoline is initially aspirated from the gasoline system in the cold state of the engine and is temporarily stored in a gasoline storage and supply device, as long as the alcohol fuel system is not activated, while upon activation, the gasoline is supplied to the intake tube of the engine without delay and accurately metered, in order to begin the combustion in the engine with gasoline; once the engine attains a predetermined threshold value of its temperature, which is sufficient for maintaining combustion with alcohol fuel, the supply of alcohol fuel through the alcohol fuel injection valves is enabled, and the injection of gasoline is interrupted. With this method, continuous and quiet engine operation during the warmup phase is attained, without the engine failure typical of the prior art.

The gasoline injection valve is preferably controlled by an electronic injection control unit as a function of the aspirated air and of the temperature of the coolant in the engine. With this apparatus, an accurate ad completely delay-free metering process is possible, and the apparatus is also responsible for the precise moment when the supply of gasoline supply is interrupted.

The present invention also relates to a gasoline storage and supply device that is suitable for being built into a cold-start apparatus for internal combustion engines operated with alcohol fuel and operates by the above-described method. This device is distinguished in that it includes a preferably cylindrical housing, in the cylinder chamber of which a displaceably disposed piston partitions off two work chambers, each having at least one inlet fitting and at least one outlet fitting, by way of which it communicates with either the alcohol fuel system or the gasoline system.

The piston preferably has circumferential grooves for receiving sealing rings, which assure good sealing between the work chamber toward the gasoline side and the work chamber toward the alcohol fuel side.

The fittings preferably have a nearly frustoconical thickening on their free ends, to enable rapid attachment of the alcohol fuel or gasoline lines both when the device is installed in the system and when it is replaced by a new device. The inlet and outlet fittings can also be equipped with built-in check valves, to prevent an undesirable reflux of fuel in the direction opposite that intended for system operation. Disposing these valves on the fittings themselves makes check valves in the lines of the gasoline and alcohol fuel cycles unnecessary.

The cold-start apparatus, the cold-start method and the gasoline storage and supply device according to the invention will be better understood and further objects and advantages thereof will become more apparent from the ensuing detailed description of preferred embodiments, taken in conjunction with the drawings.

DESCRIPTION OF THE PREFERRED EMBODIMENTS

Figure 1:
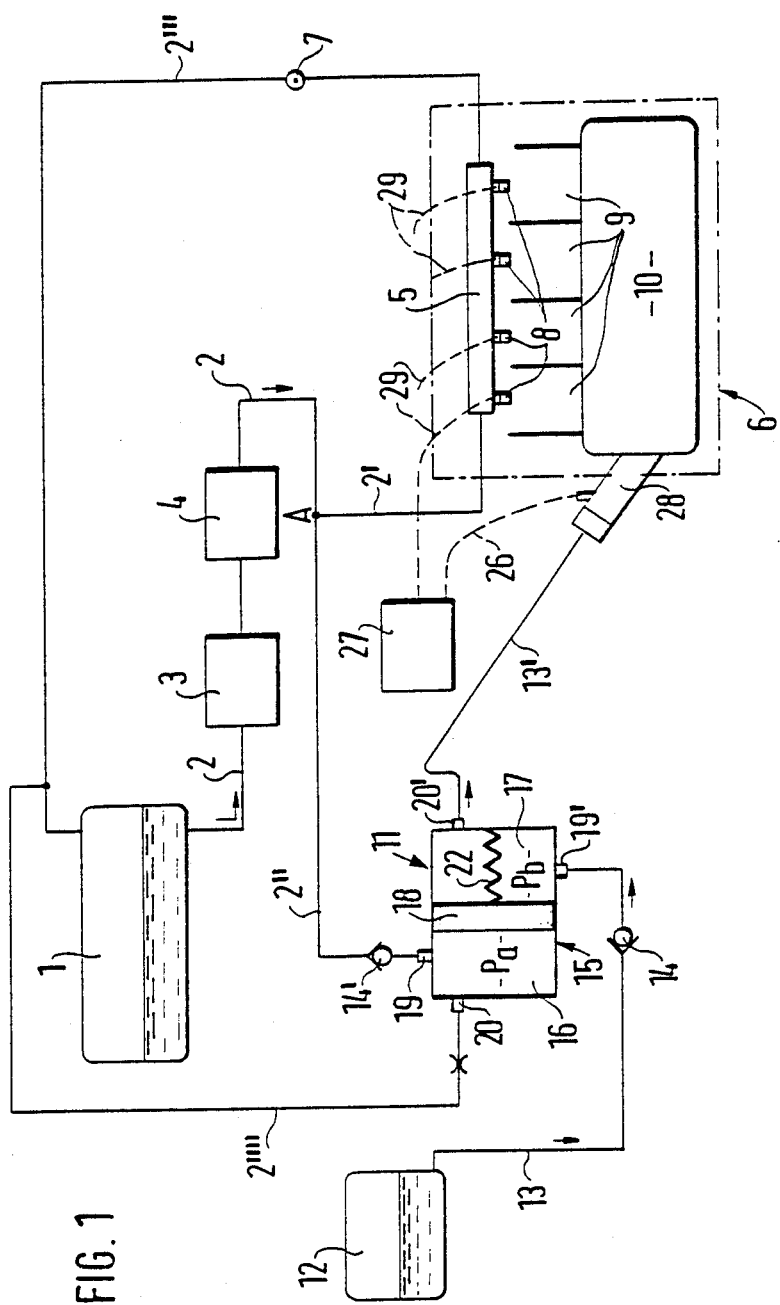
FIG. 1 is a schematic illustration of a first exemplary embodiment of the alcohol fuel cold-start apparatus according to the invention.

In FIG. 1, a first exemplary embodiment of a cold-start apparatus for alcohol-fueled internal combustion engines is shown. This apparatus includes, in association with an internal combustion engine, an alcohol fuel cycle and a gasoline cycle, as well as another device to be described later in this description. The alcohol fuel cycle comprises an alcohol fuel tank 1 and an alcohol fuel line 2, by way of which alcohol fuel can be directed to the engine. Associated with this alcohol fuel line 2 are an alcohol fuel pump 3 and optionally one or more alcohol fuel treatment devices, such as an alcohol fuel filter 4.

As can be seen in the system of FIG. 1, the alcohol fuel line 2 branches at A into two line segments 2' and 2''. The line segment 2' leads to a distributor tube 5 of the engine 6, which is shown here as a rectangle drawn in dot-dash lines. A return line segment 2''' leaves the distributor tube 5 and leads back to the alcohol fuel tank 1. A pressure regulator 7 is inserted into the return line segment 2''' in order to assure the pressure required for reliable alcohol fuel injection into the combustion chambers 9 of the engine 6. Injection valves 8 of a known type are installed in the distributor tube 5 and associated with the various combustion chambers 9. The engine 6 shown here has four cylinders, but it may have any arbitrary number of cylinders. An intake tube 10 of the engine 6 is associated with the combustion chambers 9.

Figure 3:
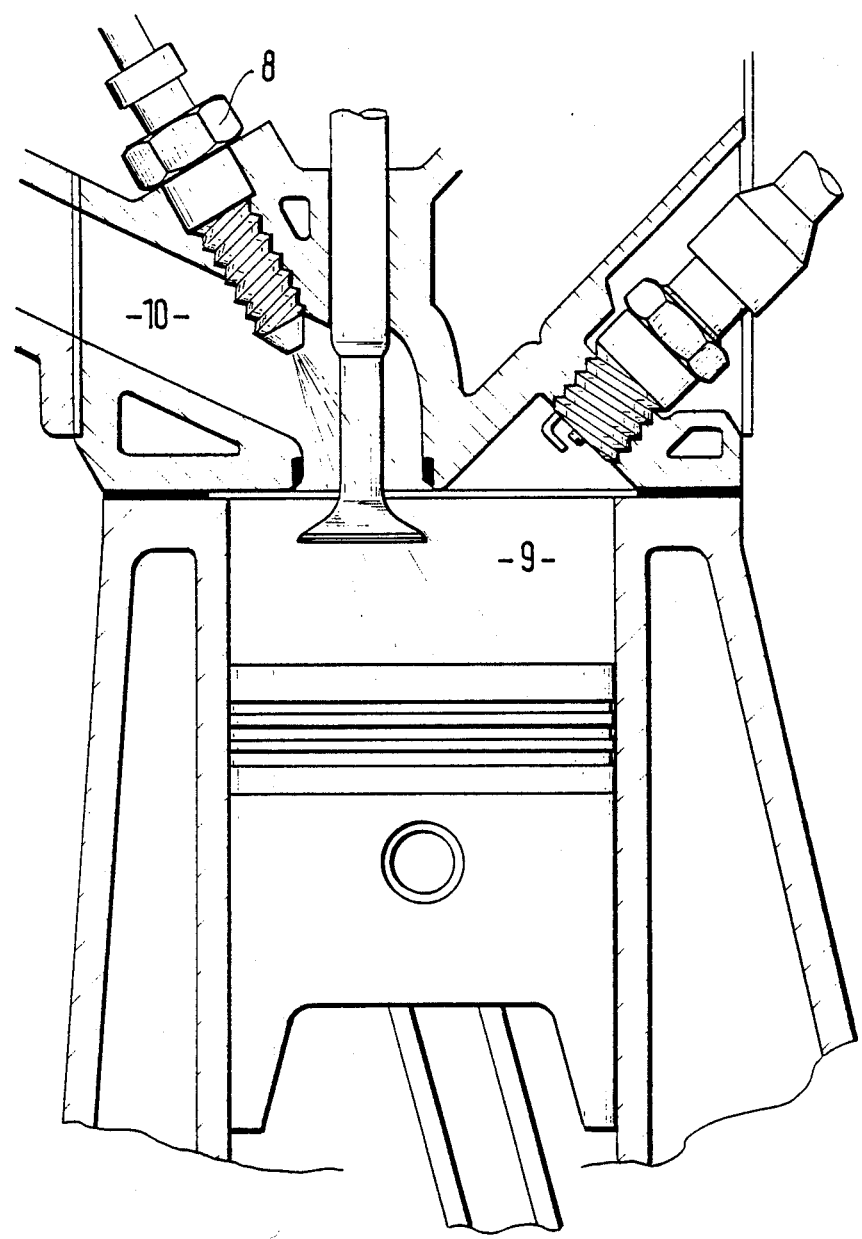
FIG. 3 is a sectional view of part of an engine.

The disposition of the injection valves 8 on the combustion engine can be seen in FIG. 3.

The line segment 2'', beginning at point A of the alcohol fuel cycle, leads to one side 16 of a gasoline storage and supply device 11, which will be described in detail below. This device 11 is also connected to the gasoline cycle, so that the alcohol fuel cycle and the gasoline cycle can mutually interact. The gasoline cycle includes a gasoline tank 12, at which a gasoline supply line 13 originates and leads to one side 17 of the gasoline storage and supply device 11. The gasoline supply line 13 includes a one-way check valve 14, for preventing the return of gasoline to the gasoline tank 12 from the gasoline storage and supply device 11.

The gasoline storage and supply device 11 is shown in greater detail in Fi. 4. In the present version, it is equipped with a housing 15, which may be cylindrical, and the interior of which is divided by a movable piston 18 into two work chambers 16 and 17.

The housing 15 has a first inlet fitting 19 and a first outlet fitting 20 that are associated with the work chamber 16, and a second inlet fitting 19' and a second outlet fitting 20' that are associated with the other work chamber 17. The fittings 19, 20; 19', 20' may have a frustoconical thickening on their free ends, on which the check valves can optionally be installed, and which may also serve to enable fast connection of the device to the lines of the alcohol fuel system and the gasoline system (see FIG. 4).

Figure 4:
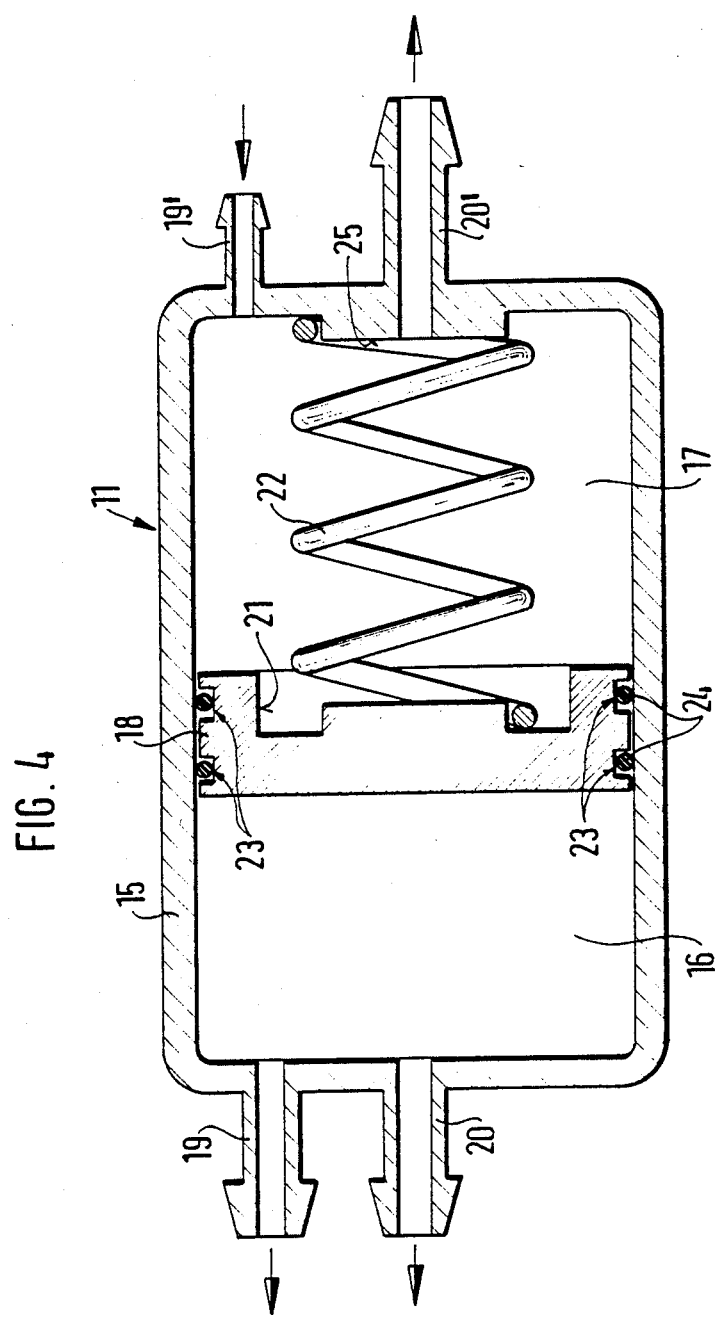
FIG. 4 shows a gasoline storage and supply device according to the invention.

As shown in further detail in FIG. 4, the piston 18 has an annular indentation 21 on its end face toward the work chamber 17, in which indentation one end of a spring element 22, preferably a helical spring that extends axially with the housing 16 can be received and retained by a suitable means; the other end of the helical spring 22 rests on an inner wall of the housing 15 around a circular inner shoulder 25. The circumference of the piston 18 has two circumferential grooves 23, into which sealing rings 24 are inserted, so that good sealing is attained between the two work chambers 16 and 17.

In the cold-start system shown in FIG. 1, the line segment 2" communicates with the work chamber 16 of the gasoline storage and supply device 11. A one-way check valve 14' is disposed in this line segment 2", for preventing the return flow of the alcohol fuel in the direction toward the alcohol fuel tank.

An outlet line 2"" communicates with the work chamber 16 via the outlet fitting 20 and leads to and joins the return line segment 2"' before the return line segment 2"' discharges into the alcohol fuel tank. The other work chamber 17 communicates with the gasoline supply line 13 via the inlet fitting 19' and with a gasoline supply line 13' via the outlet fitting 20'. The gasoline supply line 13', in turn, communicates with a gasoline injection valve 28 of a known type, which is connected to an electronic injection control unit 27 via an electric line 26. As the schematic drawings in FIGS. 1 and 2 show, the work chamber 16 communicates with the alcohol fuel cycle, while the work chamber 17 communicates with the gasoline cycle of the cold-start system according to the invention.

Figure 2:
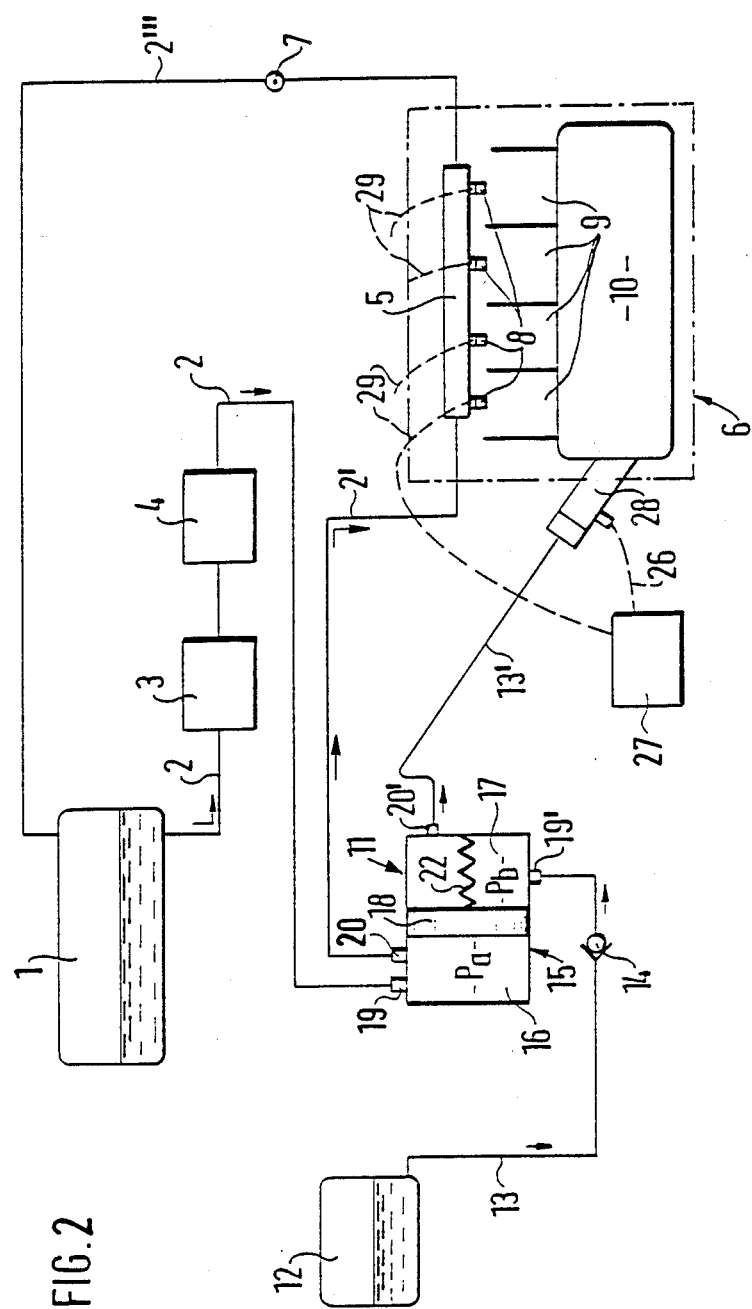
FIG. 2 shows a second exemplary embodiment of the proposed cold-start apparatus.

The exemplary embodiment shown in FIG. 2 differs slightly from that of FIG. 1. The reference numerals of FIG. 1 are therefore retained in FIG. 2.

The difference between the second example and the first is that the alcohol fuel line 2, instead of branching at point A, is continuous, and communicates with the inlet fitting 19 to the work chamber 16, while the line segment 2' communicates with the distributor tube 5 via the outlet connection 20. The outlet lines 2" and 2"" is omitted while the remaining dispositions in the system are basically identical.

Description of the Mode of Operation

Beginning at the cold state of the engine and with the system not activated, the following steps take place, until the engine has warmed up:

(a) Aspiration of the gasoline

During the night, or during a period of time, such as six hours or more, sufficient for the engine to cool down, the pressure prevailing in the alcohol fuel cycle of the system, or in other words in the alcohol fuel line 2, 2', 2", drops; a negative pressure $P_a$ results in the work chamber 16, on the alcohol fuel side of the gasoline storage and supply device 11. This means that the pressure $P_b$ prevailing in the work chamber 17 on the gasoline side is higher than the pressure prevailing in the work chamber 16 (compression spring force x piston surface area). The piston 18 moves to the left, the helical spring 22 relaxes, and gasoline is aspirated from the gasoline tank 22 through the inlet fitting 19' because of the negative pressure or vacuum action generated in the work chamber 17. The volume of this work chamber 17 must be dimensioned such that an adequate volume of gasoline (optionally in the gaseous state) is present there during the entire cold-start and warmup phase of the engine, until combustion can be maintained with alcohol fuel alone.

(b) Starting or onset of engine operation

When the engine ignition is switched on, for instance with the vehicle ignition key, the electronic control to the gasoline fuel injection valve is actuated to open the gasoline fuel injection valve as required for starting and warm-up of the engine, and the alcohol fuel pump 3 is started at the same time. As soon as the pump 3 is started, the buildup of pressure in the alcohol fuel cycle begins, more precisely in the lines 2, 2', 2", which pressure accordingly is extended as far as the work chamber 16. In the case of the exemplary embodiment shown in FIG. 1, the alcohol fuel pressure is extended first to the line segment 2', and not to the segment 2", because the check valve 14' disposed in the latter opens only at an opening pressure of 0.5 bar, for instance, less than the pressure required for supplying alcohol fuel through the line segment 2 to the distributor tube 5. The pressure regulator 7 helps in this process. The increasing pressure $P_a$ in the interior of the work chamber 16, which is generated by the alcohol fuel system, is transmitted via the surface area of the piston 18; that is, $P_a$ times the piston surface area $= P_b - F_e$ (where F is the spring force), as a result of which the piston 18 is displaced continuously toward the right, such that it forces the gasoline or gasoline mixture present in the work camber 17 to emerge continuously from that chamber via the outlet fitting 20' and be supplied under pressure to the gasoline supply line 13', as a result of which gasoline is injected into the intake tube 10 of the engine 6 by means of the open gasoline injection valve 28. Therefore, the engine is started under the influence of the electronic injection control unit 27.

(c) In the event of acceleration

Considering that in this initial "warmup phase", i.e., during idling, the engine starts up with gasoline, the gasoline injection valve 28 is also briefly opened in rapid accelerations (actuation of the accelerator pedal of the vehicle), and gasoline is injected into the intake tube 10; so-called intervening gasoline injections occur. In this acceleration situation, the required gasoline quantity must be injected without delay and accurately metered, so that proper engine operation is attainable without the undesirable "coughing" that makes for unpleasant vehicle "vibration".

The aforementioned delay-free and accurately metered injection is enabled both in starting and during idling, in its initial engine warmup phase, by the aforementioned electronic injection control unit 27, which as already noted is connected to the fuel injection valve 28 in such a manner that the control unit can control the function of this valve. Since an electronic control unit 27 of this kind is not the subject of the present invention it is not described in further detail here.

As for the function of the electronic control unit, it should be noted that as soon as the cold engine is rotated by the starter and after starting up, the control unit emits control pulses, which actuate the gasoline injection valve 28. As a result, the aforementioned gasoline injection valve 28 will be opened as long as an excitation takes place (at any rpm).

The electronic control unit 27 is supplied in a known manner with signals relating to the temperature of the coolant in the engine cooling system, which is detected by a known temperature sensor, and the aspirated air quantity, which is detected by a known air flow rate meter disposed in the intake tube 10, as well as other operating variables of the engine.

Temperature sensors and air flow rate meters, such as baffle valves, hot-wire sensors and others, are already known in the prior art and thus need no further description here.

If the temperature of the engine coolant and thus of the engine itself is below a predetermined threshold value when the ignition key is actuated, the result is hat the gasoline injection valve 28 is activated in the opening direction by the electronic control unit 27. The duration of activation of the gasoline injection valve 28 is determined by the injection control unit 27 as a function of the temperature detected and is of variable length; the higher the engine temperature, the shorter this duration.

Once the coolant temperature of the engine reaches and exceeds the predetermined temperature threshold that is sufficient for independent combustion of the alcohol fuel, the injection control unit will interrupt the activation of the gasoline injection valve 28, and now will assure fuel supply with alcohol fuel alone, by activating the injection valves 8, in the opening direction, that inject the alcohol fuel in the direction of the combustion chambers 9, for example, in which the combustion of the alcohol fuel can be maintained because of the now-suitable temperature level. The injection valves 8 that injects the alcohol fuel are activated by the electronic injection control unit 27 via electrical lines 29, as a function of operating variables of the engine 6, for instance as a function of the air quantity aspirated via the intake tube 10. It should be noted that an injection of gasoline occurs only at a temperature below the threshold value.

Although the present invention has been described on the basis of alcohol fuel and gasoline, it is also applicable when other fuels, having similar characteristics to those of the fuels described here, are used.

The foregoing relates to preferred exemplary embodiments of the invention, it being understood that other variants and embodiments thereof are possible within the spirit and scope of he invention, the latter being defined by the appended claims.

What is claimed and desired to be secured by letters patent of the United States is:

1. A cold-start apparatus for internal combustion engines having externally supplied ignition, an air intake tube for supplying air and an air-gasoline fuel mixture to the combustion chambers of the cylinders, and a fuel distributor tube for supplying a fuel such as alcohol to separate alcohol injection valves for each of said combustion chambers of said cylinders, the apparatus having an alcohol fuel cycle including an alcohol fuel tank, a fuel line leading from said alcohol fuel tank to said distributor tube, a fuel line which leads from said distributor tube back to said alcohol fuel tank, an alcohol fuel pump in said line leading from said alcohol fuel tank to said distributor tube, said injection valves communicate with said fuel distributor tube and with respective combustion chambers of the engine, and said combustion chambers are supplied with combustion air via said air-fuel intake tube, said apparatus having a gasoline cycle including a gasoline tank, a gasoline delivery line connected with said gasoline tank for delivering gasoline to said air intake tube and then to combustion chambers to initially reinforce a combustion process until combustion can be maintained by the alcohol fuel alone, and said apparatus includes a gasoline storage and supply device (11) by which said alcohol fuel cycle communicates mutually interactively with said gasoline cycle, said gasoline storage and supply device (11) operates as a function of a pressure prevailing in the alcohol fuel cycle.

2. An apparatus as defined by claim 1, in which said gasoline storage and supply device (11) stores gasoline in a non-activated state of the alcohol fuel system, and delivers this stored gasoline upon starting of the engine (6) in the activated state of the alcohol fuel system.

3. An apparatus as defined by claim 1, which includes a gasoline injection valve (28) secured to said air intake tube and said gasoline storage and supply device (11) communicates with the intake tube (10) of the engine (6) via said gasoline injection valve (28).

4. An apparatus as defined by claim 2, which includes a gasoline injection valve (28) secured to said air intake tube and said gasoline storage and supply device (11) communicates with the intake tube (10) of the engine (6) via said gasoline injection valve (28).

5. An apparatus as defined by claim 1, in which said gasoline storage and supply device (11) includes a housing (15), a movable piston (18) in said housing, said piston (18) is movable under spring action (22) in the interior of the housing (15) and divides said housing into first and second work chambers (16, 17), wherein said first work chamber communicates with said alcohol fuel cycle 2, 2'') and said second work chamber communicates with said gasoline cycle (13, 13').

6. An apparatus as defined by claim 2, in which said gasoline storage and supply device (11) includes a housing (15), a movable piston (18) in said housing, said piston (18) is movable under spring action (22) in the interior of the housing (15) and divides said housing into first and second work chambers (16, 17), wherein said first work chamber communicates with said alcohol fuel cycle (2, 2'') and said second work chamber communicates with said gasoline cycle (13, 13').

7. An apparatus as defined by claim 5, in which each of said first and second work chambers of said gasoline storage and supply device (11) includes at least one inlet fitting (19, 19') and at least one outlet fitting (20, 20').

8. An apparatus as defined by claim 6, in which each of said first and second work chambers of said gasoline storage and supply device (11) includes at least one inlet fitting (19, 19') and at least one outlet fitting (20, 20').

9. An apparatus as defined by claim 7, in which said piston (18) has circumferential grooves (23), into which sealing rings (24) are inserted to prevent any leakage between said first and second work chamber (16 and 17).

10. An apparatus as defined by claim 8, in which said piston (18) has circumferential grooves (23), into which sealing rings (24) are inserted to prevent any leakage between said first and second work chamber (16 and 17).

11. An apparatus as defined by claim 7, which includes a one-way check valve in said alcohol fuel circuit to said first work chamber (16) and a one-way check valve in said gasoline cycle to said second work chamber (17).

12. An apparatus as defined by claim 8, which includes a one-way check valve in said alcohol fuel circuit to said first work chamber (16) and a one-way check valve in said gasoline cycle to said second work chamber (17).

13. An apparatus as set forth in claim 1, which includes an electronic fuel injection control (27) for controlling alcohol fuel injection into said combustion chambers and for controlling injection of gasoline fuel into said air intake tube (10).

14. A method for cold starting an alcohol fueled internal combustion engine having externally supplied ignition which comprises turning a switch on, actuating a starter, actuating an alcohol fuel pump to build-up alcohol fuel pressure in a gasoline storage and supply device, admitting a gasoline fuel flow into an air intake tube to form a gasoline-air flow mixture, supplying the gasoline-air flow mixture to the combustion chambers of the engine to start the engine, sensing the temperature of said engine, inactuating admittance of gasoline fuel into the air intake tube upon the engine reaching a predetermined temperature, actuating control of admittance of alcohol fuel into the combustion chambers of the engine upon inactuating admittance of gasoline fuel whereby the engine is operated only by admittance of alcohol fuel.

15. A method as set forth in claim 14, which includes directing the gasoline fuel from said gasoline storage and supply device to a gasoline fuel injection valve connected with said air intake tube and opening the gasoline fuel injection valve to admit gasoline fuel into said air intake tube until the predetermined temperature has been reached.

16. A method as set forth in claim 15, which comprises operating an electronic control device which controls opening and closing of said gasoline fuel injection valves and for opening end closing alcohol fuel injection valves that inject fuel into combustion chambers of the engine.

* * * * *